United States Patent
Ramdas

(10) Patent No.: US 10,289,449 B2
(45) Date of Patent: May 14, 2019

(54) PLATFORM CAPACITY TOOL FOR DETERMINING WHETHER AN APPLICATION CAN BE EXECUTED

(71) Applicant: Bank of America Corporation, Charlotte, NC (US)

(72) Inventor: Rachit Ramdas, Yardley, PA (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 15/280,375

(22) Filed: Sep. 29, 2016

(65) Prior Publication Data

US 2018/0088994 A1    Mar. 29, 2018

(51) Int. Cl.
G06F 9/46     (2006.01)
G06F 9/455    (2018.01)
G06F 9/50     (2006.01)

(52) U.S. Cl.
CPC .................. G06F 9/5011 (2013.01)

(58) Field of Classification Search
None
See application file for complete search history.

(56) References Cited

U.S. PATENT DOCUMENTS

| | | | |
|---|---|---|---|
| 2007/0282567 A1* | 12/2007 | Dawson | G06F 11/3414 702/186 |
| 2013/0024843 A1* | 1/2013 | Kutlu | G06F 11/3414 717/125 |
| 2016/0283271 A1* | 9/2016 | Ashby, Jr. | G06F 9/5072 |
| 2016/0314176 A1* | 10/2016 | Dhayapule | H04L 67/1002 |
| 2017/0149681 A1* | 5/2017 | Chen | H04L 41/0806 |
| 2017/0351546 A1* | 12/2017 | Habak | G06F 9/5027 |

* cited by examiner

*Primary Examiner* — Bradley A Teets
(74) *Attorney, Agent, or Firm* — Michael A. Springs

(57) ABSTRACT

A platform capacity tool includes a retrieval engine, a capacity consumption engine, and a workload projection engine. The platform capacity tool determines whether there is sufficient memory, processor, and/or network resources to execute an application. The platform capacity tool makes these determinations based on process capacity consumptions and/or application capacity consumptions.

12 Claims, 3 Drawing Sheets

PLATFORM CAPACITY TOOL FOR DETERMINING WHETHER AN APPLICATION CAN BE EXECUTED

TECHNICAL FIELD

This disclosure relates generally to platform capacity.

BACKGROUND

Enterprises utilize a platform to execute software applications. Executing the software applications consumes computer resources. For example, executing the software applications consumes memory resources, network bandwidth, and central processing unit resources.

SUMMARY OF THE DISCLOSURE

According to an embodiment, a platform capacity tool includes a retrieval engine, a capacity consumption engine, and a workload projection engine. The retrieval engine receives a request to determine a projected workload of a first process of an application comprising a plurality of processes. The projected workload indicates two or more of an amount of memory, central processing unit ("CPU") usage, storage, and network bandwidth required execute the first process at a same time as a second process of the plurality of processes. The retrieval engine receives the application in response to the request. The capacity consumption engine determines, for each of the plurality of processes, a plurality of process capacity consumptions. Each process capacity consumption indicates one of an amount of memory, CPU usage, storage, and network bandwidth required to execute the process. The capacity consumption engine determines, for each of the plurality of processes, a total processing value for the process. The total processing value for the process is an aggregation of each of the plurality of process capacity consumptions for the process. The capacity consumption engine determines a plurality of application capacity consumptions for the application, wherein each application capacity consumption indicates one of an amount of memory, CPU usage, storage, and network bandwidth required to execute the application. The capacity consumption engine determines a total processing value for the application, wherein the total processing value for the application is an aggregation of each of the plurality of application capacity consumptions. The workload projection engine determines a combined total processing value, wherein the combined total processing value is an aggregation of the total processing value for each of the plurality of processes. The workload projection engine determines the projected workload for the first process based on, at least in part, the combined total processing value and the total processing value for the application.

According to another embodiment, a method includes receiving a request to determine a projected workload of a first process of an application comprising a plurality of processes, the projected workload indicating two or more of an amount of memory, central processing unit ("CPU") usage, storage, and network bandwidth required execute the first process at a same time as a second process of the plurality of processes. The method further includes receiving the application in response to the request. The method further includes determining a plurality of process capacity consumptions, wherein each process capacity consumption indicates one of an amount of memory, CPU usage, storage, and network bandwidth required to execute the process. The method further includes determining a total processing value for the process, wherein the total processing value for the process is an aggregation of each of the plurality of process capacity consumptions for the process. The method further includes determining a plurality of application capacity consumptions for the application, wherein each application capacity consumption indicates one of an amount of memory, CPU usage, storage, and network bandwidth required to execute the application. The method further includes determining a total processing value for the application, wherein the total processing value for the application is an aggregation of each of the plurality of application capacity consumptions. The method further includes determining a combined total processing value, wherein the combined total processing value is an aggregation of the total processing value for each of the plurality of processes. The method further includes determining the projected workload for the first process based on, at least in part, the combined total processing value and the total processing value for the application.

According to yet another embodiment, a system includes a database, and interface, and a processor. The database is configured to store an application. The interface receives a request to determine a projected workload of a first process of an application comprising a plurality of processes, the projected workload indicating two or more of an amount of memory, central processing unit ("CPU") usage, storage, and network bandwidth required execute the first process at a same time as a second process of the plurality of processes. The interface receives the application from the database in response to the request. The processor, for each of the plurality of processes, determines a plurality of process capacity consumptions, wherein each process capacity consumption indicates one of an amount of memory, CPU usage, storage, and network bandwidth required to execute the process. The processor, for each of the plurality of processes, determines a total processing value for the process, wherein the total processing value for the process is an aggregation of each of the plurality of process capacity consumptions for the process. The processor determines a plurality of application capacity consumptions for the application, wherein each application capacity consumption indicates one of an amount of memory, CPU usage, storage, and network bandwidth required to execute the application. The processor determines a total processing value for the application, wherein the total processing value for the application is an aggregation of each of the plurality of application capacity consumptions. The processor determines a combined total processing value, wherein the combined total processing value is an aggregation of the total processing value for each of the plurality of processes. The processor determines the projected workload for the first process based on, at least in part, the combined total processing value and the total processing value for the application.

Certain embodiments provide one or more technical advantages. For example, an embodiment ensures that a computer system has a sufficient amount of resources to execute one or more software applications. As another example, the amount of computer resources required to execute an application may be accurately determined. As another example, an embodiment improves process scheduling. For example, an embodiment determines when to execute a process and/or on which machine to execute a process to maximize a computer's resources. As yet another example, an embodiment efficiently and accurately determines the number of machines needed to execute processes and/or applications.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
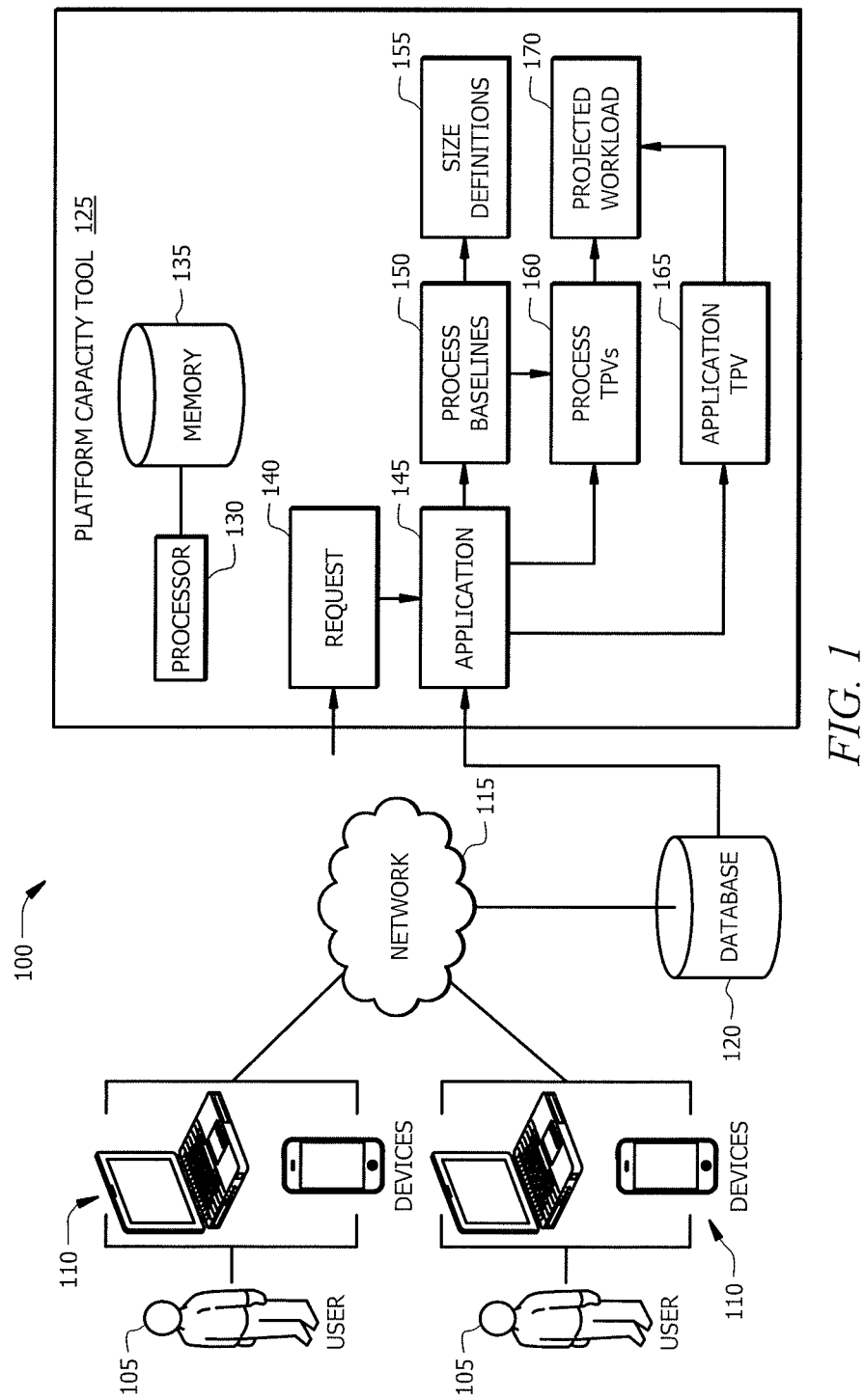
FIG. 1 illustrates a system for creating a projected workload.
Figure 2:
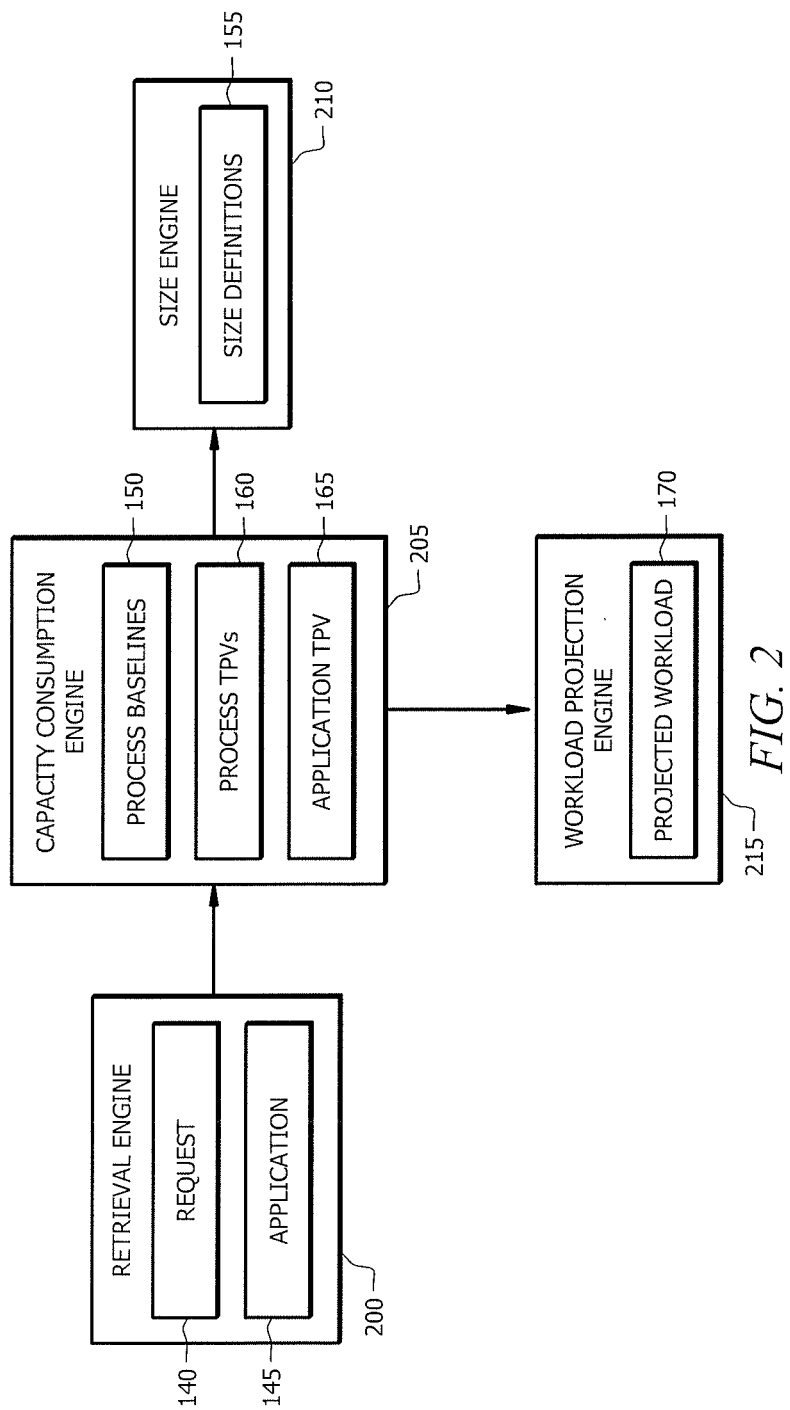
FIG. 2 illustrates the platform capacity tool of the system of FIG. 1.
Figure 3:
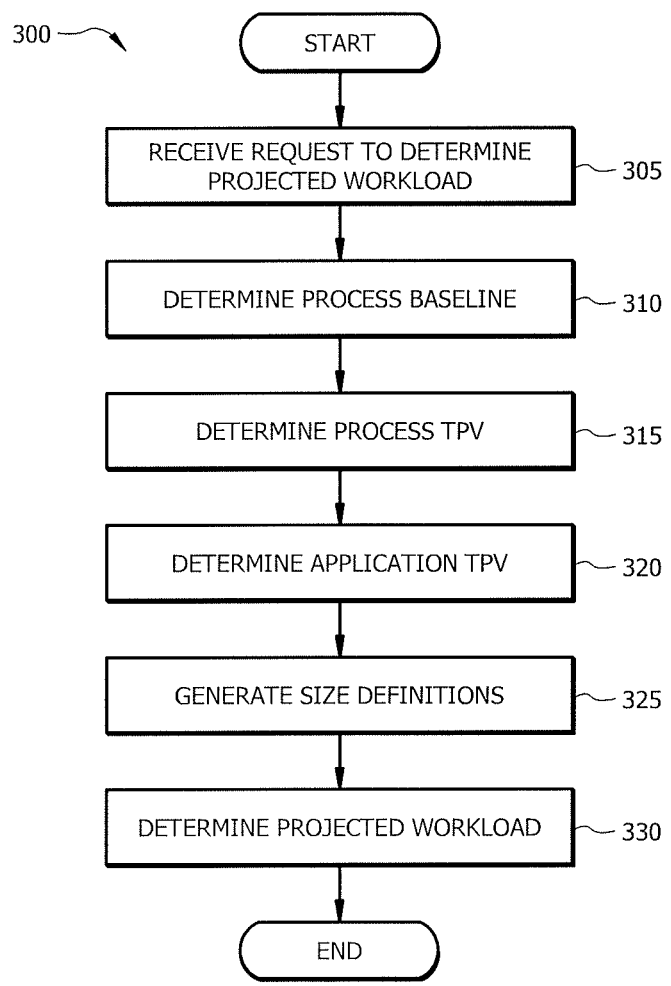
FIG. 3 is a flowchart illustrating a method for creating a projected workload using the system of FIG. 1.

Embodiments of the present disclosure and its advantages are best understood by referring to FIGS. 1 through 3 of the drawings, like numerals being used for like and corresponding parts of the various drawings.

Enterprises execute applications using one or more enterprise platforms. For example, enterprises may execute applications using one or more servers. Each application may comprise a plurality of processes. Executing an application, thus, requires executing one or more of the underlying application processes. Each process may consume computer resources. For example, executing a process may consume central processing unit (CPU) resources, memory resources, storage, and/or network bandwidth.

As one or more systems execute a growing number of applications and/or a growing size of applications, system resources may become scarce and the computing resources may be insufficient. In some embodiments, a server may be operating at or near capacity and thus may be unable to execute additional processes and/or applications. Before attempting to execute additional processes and/or applications, platform capacity planning may be required. Platform capacity planning generally requires determining whether current platform resources have the capacity to execute a projected number of applications and/or processes. Platform capacity planning may require determining the number of machines needed to execute a projected number of applications and/or processes.

Traditional platform capacity planning is limited. For example, traditional platform capacity planning may consider only the CPU usage of a particular application. This disclosure recognizes the advantages of a system performing platform capacity planning with a wider knowledge base. For example, executing an application and/or a process may require more than an increased CPU consumption. Executing an application and/or process may require memory consumption, storage consumption, and/or bandwidth consumption.

Additionally, this disclosure recognizes the advantages of performing granular platform capacity planning. Traditional platform capacity planning may determine an amount of computer resources required to execute a particular application. However, it is advantageous to determine the amount of computer resources required to execute of each process within the application. All processes in an application may not need to be executed at the same time. Determining the consumption required to execute each process allows determining, with a greater accuracy, the consumption required to execute each process at a particular time. This also provides the added advantage of determining the additional computer resources required to add a process to an existing application.

This disclosure contemplates a platform capacity tool that determines a projected workload of a process. For example, the platform capacity tool may determine the computer resource consumption required to execute a process. The platform capacity tool may further determine the total processing value to execute the process, wherein the total processing value is an aggregation of the consumption of each of the server components. Using this granular information provides the advantage of allowing servers to utilize their computing resources most efficiently. For example, this disclosure contemplates receiving a higher usage of computing components without overburdening the computer systems. The platform capacity tool will be described in more detail using FIGS. 1 through 3. FIG. 1 will describe the platform capacity tool generally. FIGS. 2 and 3 will describe the platform capacity tool in more detail.

FIG. 1 illustrates a system 100 for creating a projected workload. As illustrated in FIG. 1, system 100 includes one more devices 110, a network 115, a database 120, and a platform capacity tool 125. In particular embodiments, system 100 improves software application execution by improving the accuracy of platform capacity planning.

Devices 110 may be any devices that operate and/or communicate with other components of system 100. Devices 110 may be associated with an enterprise and/or business units of an enterprise. Users 105 may utilize devices 110 to communicate request 140 to platform capacity tool 125 to perform platform capacity planning.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores application 145. Application 145 may comprise a plurality of processes. Each of these processes may consume server resources when executed. Database 120 may store any numbers of applications 145. For example a database 120 may store a database application, a Master Data Management messaging application (MDM), and/or an Extract Transform Load application (ETL). Database 120 may communicate application 145 to platform capacity tool 125 via network 115. Database 120 may comprise a single database or any suitable number of databases.

One or more servers may execute one or more applications 145 stored in database 120. The servers may be operating at or near capacity and thus may be unable to execute additional processes and/or applications. Before attempting to execute additional processes and/or applications, platform capacity planning may be required. Platform capacity planning generally requires determining whether current platform resources have the capacity to execute a projected number of applications and/or processes. Platform capacity planning may require determining the number of machines needed to execute a projected number of applications and/or processes.

Platform capacity tool 125 facilitates platform capacity planning by generating a projected workload for one or more processes within application 145 to improve system resource usage and execution of application processes. As illustrated in FIG. 1, platform capacity tool 125 includes a processor 130 and a memory 135. This disclosure contemplates processor 130 and memory 135 being configured to perform any of the operations of platform capacity tool 125 described herein. In particular embodiments, platform capacity tool 125 improves the efficiency and accuracy of performing platform capacity planning.

Processor 130 is any electronic circuitry, including, but not limited to microprocessors, application specific integrated circuits (ASIC), application specific instruction set processor (ASIP), and/or state machines, that communicatively couples to memory 135 and controls the operation of platform capacity tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of platform capacity tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 request 140. This disclosure contemplates memory 135 storing any of the elements stored in database 120 and/or by platform capacity tool 125.

Platform capacity tool 125 receives a request 140. Request 140 may comprise a request to gather information to facilitate platform capacity planning. For example, request 140 may comprise a request to determine a projected workload 170 for a process of application 145. Request 140 may be sent by one or more devices 110. Request 140 may indicate the name of an application 145 and/or process of application 145.

Platform capacity tool 125 may analyze request 140 to determine an application 145 and a process of application 145. In particular embodiments, a user 105 may wish to determine the projected workload 170 for the process of application 145. In an embodiment, application 145 is a database application. As another example, application 145 may be an ETL application. As yet another example, application 145 may be an MDM application. Application 145 may be any suitable application that consumes server component resources when executed.

Platform capacity tool 125 may utilize application 145 to determine process baselines 150. Generally, a process baseline indicates the capacity consumption of a process, such as the utilization of a server resource. Executing a process may utilize server components. For example, executing a process may utilize CPU, memory, storage, and/or network resources of a server. In an embodiment platform capacity tool 125 determines the capacity consumption of a process by executing the process and measuring the capacity consumption. For example, the process may be executed in a sandbox, a testing environment that isolates code for testing.

Platform capacity tool 125 determines a process total processing value (TPV) 160 for each process using process baselines 150 and/or application 145. Generally, a process TPV indicates the server utilization during the duration of executing a process. For example, a process TPV may indicate the percentage consumption of a server executing the process. In an embodiment, platform capacity tool 125 determines a process TPV by aggregating each of the process baselines for the process. For example, platform capacity tool 125 may aggregate a CPU process baselines 150, a memory process baseline 150, a storage process baseline 150, and/or a bandwidth process baseline 150 associated with a process to determine the process TPV 160 for the process.

Platform capacity tool may generate size definitions 155 using process baselines 150 and/or process TPVs 160. Generally, size definitions 155 indicate the relative server component consumption required to execute a process. Some processes may require a relatively small amount of server component resources to execute. As another example, some processes may require a relatively large amount of server component resources to execute. As yet another example, some processes may require a relatively large amount of certain server resources (e.g., a process may require a relatively large amount of memory to execute, but also a relatively small amount of CPU). Size definitions may be used to facilitate process scheduling. For example, an enterprise may determine the amount of available resources at a particular time and utilize size definitions 155 to determine when and/or on which machine to execute a particular process.

Platform capacity tool 125 may determine an application TPV 165 for application 145. An application TPV 165 is similar to a process TPV 160 discussed previously. However, application TPV 165 is determined on an application-wide basis rather than a process basis. For example, an entire application 145 may be executed in a sandbox with the application TPV 165 determined as discussed above.

Platform capacity tool 125 may determine a projected workload 170 for a process. Generally, a projected workload 170 indicates the server components utilization required to execute a process. Platform capacity tool 125 may determine projected workload 170 by aggregating each of the process TPVs 160 for an application and comparing the aggregated process TPVs 160 to application TPV 165. The comparison of the aggregated process TPVs 160 and the application TPV 165 yields a high accuracy of the actual performance for a given process. In an embodiment, when a new process is being on-boarded on an application, the TPV of a similar process may be used to determine the projected workload of that process. This provides the advantage of determined the added capacity consumption and/or TPV of adding a process to an application.

Modifications, additions, or omissions may be made to system 100 without departing from the scope of the invention. For example, system 100 may include any number of processors 130, memory 135, devices 110, and/or databases 120. platform capacity tool 125 may not create size definitions 155. As yet another example, platform capacity tool 125 may not compare aggregated process TPVs 160 and application TPV 165 to determine a projected workload. In this embodiment, platform capacity tool 125 may rely on a process TPV 160 to determine a projected workload 170. Furthermore, the components of system 100 may be integrated or separated. For example, in particular implementations, memory 135 may be separated into multiple memories 135 to store the data descried herein. Although generally described as server resources, this disclosure contemplates any type of resources for any type of computing and/or storage machine.

FIG. 2 illustrates the platform capacity tool 125 of the system 100 of FIG. 1. As illustrated in FIG. 2, platform capacity tool 125 includes retrieval engine 200, capacity consumption engine 205, size engine 210, and workload projection engine 215. In particular embodiments, platform capacity tool 125 determines the amount of computer resources required to execute an application and/or a process of an application. This information may allow servers to ensure that there are sufficient resources to execute the applications and/or the processes of the applications completely. A system with inadequate resources may be unable to execute an application, but the system may have sufficient resources to execute some processes of the application.

Retrieval engine 200 receives request 140 and application 145. In particular embodiments, retrieval engine 200 receives request 140 from one or more devices 110. Request 140 may comprise a request to determine a projected workload 170 for a process of application 145. Retrieval engine 200 receives application 145 from database 120. Retrieval engine 200 may receive application 145 in response to request 140. An example algorithm for retrieval engine 200 is as follows: wait for request 140; receive request 140 from one or more devices 110; in response to receiving request 140, retrieve application 145 from database 120.

In the illustrated embodiment, capacity consumption engine 205 determines process baselines 150, process TPVs 160 and application TPV 165. As discussed, a process baseline 150 indicates the capacity consumption required to execute a process. Executing a process consumer CPU, memory, storage, and/or bandwidth resources of a server. Capacity consumption engine 205 determines the capacity consumption of a process by executing the process and measuring the capacity consumption. For example, the process may be executed in a sandbox, a testing environment that isolates code for testing.

In an embodiment, processes in an application may be hierarchical. For example, an application may be launched using a single process and additional processes may be executed as more functionality is added to the application and/or a user indicates prompts more application. For example, in a database application, database software may launched before performing other processes (e.g., Oracle software for an Oracle database). Next a database instance may executed. Next data may be added to the database, and finally a query may be ran on the database. For hierarchical processes, each process may not be ran independently to determine process baselines. In this embodiment, process baselines may be determined for a first process by executing the first process. For example, the first process may be executed in a sandbox. A second process may be added to the sandbox and executed alongside the first process. The second process baselines may be determined by subtracting the first process baselines from the baselines determined by executing the first and second processes together. This process may continue until the process baselines are determined for all processes in an application.

Capacity consumption engine 205 may further determine a process TPV 160 for one or more processes of application 145. As discussed, a process TPV 160 may indicate the server utilization during the duration of executing a process. For example, a process TPV may indicate the percentage of a server that is executing the process consumes. An example algorithm for capacity consumption engine 205 to determine process baselines 150 and process TPVs 160 is as follows: receive application 145; execute one or more processes of application 145 to determine process baselines 150; aggregate the process baselines 150 for a process to determine a process TPV for the process.

Capacity consumption engine 205 may determine an application TPV 165. Application TPV 165 may be the TPV for application 145. Capacity consumption engine 205 determines application TPV in a similar way to determine a process TPV with the difference that capacity consumption engine 205 executes application 145 in its entirety when determining the TPV, rather than determining a TPV for each individual process. An example algorithm for capacity consumption engine 205 to determine application TPV 165 is as follows: receive application 145; execute application 145 to determine application baselines for application 145; aggregate application baselines to determine application TPV 165.

Size engine 210 generates size definitions 155 from process baselines 150, process TPVs 160, and/or application TPV 165. Generally, size definitions 155 indicate the relative server component consumption required to execute a process. Some processes may require a relative small amount of server component resources to execute. As another example, some processes may require a relative large amount of server component resources to execute. As yet another example, some processes may require a relative large amount of certain server computer resources (e.g., a process may require a relatively large amount of memory to execute, but also a relatively small amount of CPU). Size definitions 155 may define the size of a process based on predetermined criteria. For example, each process above a predetermined network component resource consumption may be classified as a large process (e.g., a process that consumes over 1 GB of memory when executed). As another example, size definition may define the size of a process based on the process's process TPV 160 as computer to other process TPVs 160. In an embodiment, size engine 210 sorts processes by one or more process baselines 150 and/or process TPVs 160 to determine size definitions 155. Size definitions may be used to facilitate process scheduling. For example, an enterprise may determine the amount of available resources at a particular time and utilize size definitions 155 to determine when to execute a particular process. While discussed as applying to processes, size definitions 155 may describe the relative size of an application 145. An example algorithm for size engine 210 to generate a size definition 155 for a process is as follows: receive process baselines 150 and/or a process TPV 160; compare one or more process baselines 150 and/or process TPV 160 to process baselines 150 and/or process TPVs 160 associated with at least one other process; determine the relative size of one or more process baselines 150 and/or process TPV 160 associated with the process; generate one or more size definitions 155 based on the relative size of the process.

Workload projection engine 215 uses application TPV 165, process baselines 150, and/or process TPVs 160 to determine projected workload 170. Generally, a projected workload 170 indicates the server components utilization required to execute a process. Workload projection 170 may be used in platform capacity planning to determine the number and/or size of servers to execute a process, and application, or a plurality of processes and/or applications. Workload projection engine 215 may determine projected workload 170 by aggregating each of the process TPVs 160 for an application and comparing the aggregated process TPVs 160 to application TPV 165. The comparison of the aggregated process TPVs 160 and the application TPV 165 yields a high accuracy of the actual performance for a given process. In an embodiment, when a new process is being on-boarded on an application, the TPV of a similar process may be used to determine the projected workload of that process. This provides the advantage of determined the added capacity consumption and/or TPV of adding a process to an application. An example algorithm for workload projection engine 215 to generate a projected workload 170 for a process is as follows: receive process TPVs 160 for each process in an application; receive application TPV; aggregate each process TPV 160 for the application; compare the aggregated process TPVs 160 and application TPV 165 to generate projected workload 170.

FIG. 3 is a flowchart illustrating a method 300 for creating a projected workload 170 using the system 100 of FIG. 1. In particular embodiments, platform capacity tool 125 performs method 300. By performing method 300, platform capacity tool 125 100 improves the accuracy of platform capacity planning.

Platform capacity tool 125 begins by receiving a request 140 to determine a projected workload 170 for a process in application 145 at step 305. In step 310, platform capacity tool 125 determines one or more process baselines 150 for application 145 in response to request 140. Platform capacity tool 125 then determines a process TPV 160 for one or more of the processes in application 145 in step 315. Platform capacity tool 125 determines an application TPV for application 145 in step 320.

In step 325, platform capacity tool 125 generates size definitions 155 for one or more of the processes in application 145. Platform capacity tool 125 uses process baselines 150, process TPVs 160, and/or application TPV 165 to generate projected workload 170 in step 330.

Modifications, additions, or omissions may be made to method 300 depicted in FIG. 3. Method 300 may include more, fewer, or other steps. For example, steps may be performed in parallel or in any suitable order. While discussed as platform capacity tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A platform capacity tool comprising:
a hardware processor configured to implement:
a retrieval engine configured to:
receive a request to determine a projected workload of a first process of an application comprising a plurality of processes, the plurality of processes comprising a second process, the second process is executing when the first process begins execution, the projected workload indicating two or more of an amount of memory, central processing unit ("CPU") usage, storage, and network bandwidth for executing the first process at a same time as the second process, the application is one of a Master Data Management messaging application and an Extract Transform Load application, wherein the application comprises a database application, the first process comprises a database software process, and the second process comprises a database storage process, and the application further comprising:
a third process comprising a data table process; and
a fourth process comprising a database query process; and
receive the application in response to the request;
a capacity consumption engine configured to, for each process of the plurality of processes excluding the first process:
determine a plurality of process capacity consumptions, wherein each process capacity consumption indicates one of an amount of memory, CPU usage, storage, and network bandwidth required to execute the process; and
determine a total processing value for the process, wherein the total processing value for the process is an aggregation of each of the plurality of process capacity consumptions for the process;
the capacity consumption engine further configured to:
determine a plurality of application capacity consumptions for the application, wherein each application capacity consumption indicates one of an amount of memory, CPU usage, storage, and network bandwidth required to execute the application; and
determine a total processing value for the application, wherein the total processing value for the application is an aggregation of each of the plurality of application capacity consumptions; and a workload projection engine configured to:
   determine a combined total processing value, wherein the combined total processing value is an aggregation of the total processing value for each of the plurality of processes; and
   determine the projected workload for the first process based on, at least in part, the combined total processing value and the total processing value for the application, the projected workload is used to determine a number of machines required to execute the application, the application is executed if the number of machines is available.

2. The platform capacity tool of claim 1, wherein the workload processing engine determines the projected workload for the first process based on, at least in part, the combined total processing value, the total processing value for the application, and the total processing value for the first process.

3. The platform capacity tool of claim 1, further comprising a size engine configured to determine a size definition for at least one of the plurality of processes, the size definition indicating a relative capacity consumption of the process, wherein the size definition is used to determine process scheduling.

4. The platform capacity tool of claim 1, wherein the workload projection engine is further configured to determine a future workload projection based on the projected workload and at least one of a projected number of future database query processes and a projected number of future data table processes.

5. A method comprising:
receiving a request to determine a projected workload of a first process of an application comprising a plurality of processes, the plurality of processes comprising a second process, the second process is executing when the first process begins execution, the projected workload indicating two or more of an amount of memory, central processing unit ("CPU") usage, storage, and network bandwidth for executing execute the first process at a same time as the second process, the application is one of a Master Data Management messaging application and an Extract Transform Load application, wherein the application comprises a database application, the first process comprises a database software process, and the second process comprises a database storage process, and the application further comprising:
a third process comprising a data table process; and
a fourth process comprising a database query process;
receiving the application in response to the request;
determining a plurality of process capacity consumptions for the plurality of processes except the first process, wherein each process capacity consumption indicates one of an amount of memory, CPU usage, storage, and network bandwidth required to execute the process; and
determining a total processing value for the process, wherein the total processing value for the process is an aggregation of each of the plurality of process capacity consumptions for the process;
determining a plurality of application capacity consumptions for the application, wherein each application capacity consumption indicates one of an amount of memory, CPU usage, storage, and network bandwidth required to execute the application;
determining a total processing value for the application, wherein the total processing value for the application is an aggregation of each of the plurality of application capacity consumptions;
determining a combined total processing value, wherein the combined total processing value is an aggregation of the total processing value for each of the plurality of processes;
determining the projected workload for the first process based on, at least in part, the combined total processing value and the total processing value for the application, the projected workload is used to determine a number of machines required to execute the application, the application is executed if the number of machines is available.

6. The method of claim 5, wherein determining the projected workload for the first process based on, at least in part, the combined total processing value, the total processing value for the application, and the total processing value for the first process.

7. The method of claim 5, further comprising determining a size definition for at least one of the plurality of processes, the size definition indicating a relative capacity consumption of the process, wherein the size definition is used to determine process scheduling.

8. The method of claim 5, further comprising determining a future workload projection based on the projected workload and at least one of a projected number of future database query processes and a projected number of future data table processes.

9. A system comprising:
a database configured to store an application; and
a hardware interface configured to:
   receive a request to determine a projected workload of a first process of an application comprising a plurality of processes, the plurality of processes comprising a second process, the second process is executing when the first process begins execution, the projected workload indicating two or more of an amount of memory, central processing unit ("CPU") usage, storage, and network bandwidth for executing execute the first process at a same time as the second process, the application is one of a Master Data Management messaging application and an Extract Transform Load application, wherein the application comprises a database application, the first process comprises a database software process, and the second process comprises a database storage process, and further comprising:
a third process comprising a data table process; and
a fourth process comprising a database query process; and
receive the application from the database in response to the request;
a hardware processor configured to, for each process of the plurality of processes except the first process:
   determine a plurality of process capacity consumptions, wherein each process capacity consumption indicates one of an amount of memory, CPU usage, storage, and network bandwidth required to execute the process; and
   determine a total processing value for the process, wherein the total processing value for the process is an aggregation of each of the plurality of process capacity consumptions for the process; the hardware processor further configured to:
   determine a plurality of application capacity consumptions for the application, wherein each application capacity consumption indicates one of an amount of memory, CPU usage, storage, and network bandwidth required to execute the application; and determine a total processing value for the application, wherein the total processing value for the application is an aggregation of each of the plurality of application capacity consumptions;

determine a combined total processing value, wherein the combined total processing value is an aggregation of the total processing value for each of the plurality of processes; and determine the projected workload for the first process based on, at least in part, the combined total processing value and the total processing value for the application, the projected workload is used to determine a number of machines required to execute the application, the application is executed if the number of machines is available.

10. The system of claim 9, wherein the hardware processor determines the projected workload for the first process based on, at least in part, the combined total processing value, the total processing value for the application, and the total processing value for the first process.

11. The system of claim 9, wherein the hardware processor is further configured to determine a size definition for at least one of the plurality of processes, the size definition indicating a relative capacity consumption of the process, wherein the size definition is used to determine process scheduling.

12. The system of claim 9, wherein the hardware processor is further configured to determine a future workload projection based on the projected workload and at least one of a projected number of future database query processes and a projected number of future data table processes.

* * * * *